Patented Nov. 8, 1949

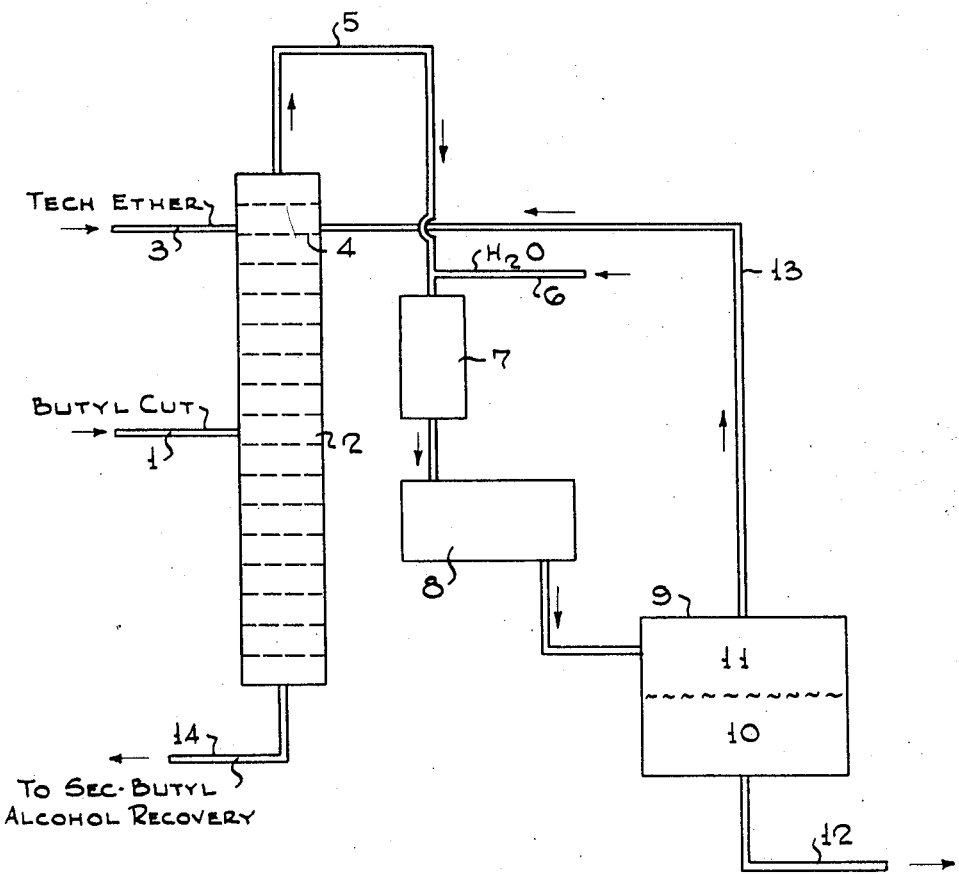

2,487,086

UNITED STATES PATENT OFFICE 2,487,086

SEPARATION OF ISOPROPYL ALCOHOL AND SECONDARY BUTYL ALCOHOL BY AZEOTROPIC DISTILLATION

Erwin H. Amick, Jr., Linden, and William S. Harney, Jr., Elizabeth, N. J., assignors to Standard Oil Development Company, a corporation of Delaware Application December 28, 1946, Serial No. 718,921

4 Claims. (Cl. 202—42)

This invention relates to the purification of isopropyl alcohol, particularly to the purification of isopropyl alcohol which during its manufacture becomes contaminated with secondary butyl alcohol and, of course, water.

Isopropyl alcohol may be manufactured by any of a number of known methods. One of the best known methods for producing isopropyl alcohol is the absorption of propylene in a mineral acid such as sulfuric acid to form an ester extract, hydrolysis of the extract with water and distillation of the hydrolyzed extract to yield isopropyl alcohol. The propylene feed is derived from olefin hydrocarbons such as are available from petroleum refining sources. It is difficult to obtain a 100% separation of the desired olefin from the hydrocarbon stream which is to be extracted with sulfuric acid. For example, in the preparation of isopropyl alcohol by absorption in sulfuric acid of olefin hydrocarbons containing substantially propylene, some butylene is present due to incomplete separation of the $C_3$ and $C_4$ olefins. When such is the case a great part of the butylene is converted to butyl sulfate by absorption in acid and consequently during the subsequent hydrolysis, this butyl sulfate is converted to secondary butyl alcohol which contaminates the desired product isopropyl alcohol and imparts thereto an undesirable odor. In the commercial manufacture of isopropyl alcohol, the propylene hydrocarbon feed contains up to 1% of butylenes depending upon the source of the feed. This leads to the formation of an isopropyl alcohol product containing contaminating amounts of secondary butyl alcohol.

Plant streams of isopropyl alcohol are frequently obtained therefore, which contain secondary butyl alcohol and water. The separation of the two alcohols, in the presence of water, by fractional distillation, is a difficult procedure demanding highly efficient fractionation. The water causes the formation of binary azeotropes of both alcohols, viz., isopropyl alcohol-water, boiling at 80.3° C. and sec.-butyl alcohol-water, boiling at 87.3° C. The difference in boiling points is, therefore, 7.0° C.

This invention provides a means whereby the alcohols can be separated by distillation by the creation of other azeotropes in the system which make the separation easier as a result of an increase in the boiling point span between the azeotropes containing the isopropyl alcohol and the sec.-butyl alcohol. This invention also provides special methods of operating the distillation unit and processing the distillate received.

This invention discloses that the introduction of a low boiling aliphatic ether, such as isopropyl ether to a distillation column processing isopropyl alcohol and secondary butyl alcohol results in the formation of a lower boiling ternary azeotrope of isopropyl ether-isopropyl alcohol-water (boiling point is 61.6° C.). There is no ternary azeotrope formed by the isopropyl ether with the sec.-butyl alcohol and water; hence, its effective boiling point remains that of the binary azeotrope with water, viz., 87.3° C. Consequently, the difference in boiling point between the azeotropes containing the alcohols has been increased from 7.0° C. to about 25.7° C. The efficiency of the fractionating column required to make an effective separation is thereby greatly reduced.

In carrying out the invention, therefore, sufficient isopropyl ether is added to the isopropyl alcohol stream to form the ternary azeotrope of isopropyl ether-isopropyl alcohol-water. Since isopropyl ether is one of the by-products of the isopropyl alcohol manufacture, separate ether recovery facilities are normally present in the isopropyl alcohol process. This invention therefore, is advantageous from a materials standpoint in that it does not require the addition of an agent which is not already inherent in the isopropyl alcohol manufacture system.

To illustrate the invention, reference is made to the accompanying drawing which is a diagrammatic view of the flow plan of the process. A feed stock called the "butyl cut" containing both isopropyl alcohol and secondary butyl alcohol in the presence of water, is pumped through line 1 to a fractionating column 2 to which "washed heads," a technical grade of isopropyl ether, is added through line 3 above plate 4. As shown, the distillate from the column is the ternary azeotrope of isopropyl ether-isopropyl alcohol-water taken from line 5, mixed with water from line 6, and led to decanter 9 after mixing in mixer 7 and settling in settler 8. The lower aqueous layer 10 in the decanter may be sent through line 12 to another recovery unit where the isopropyl alcohol can be separated from the small amount of ether present and the large amount of water by conventional distillation. This lower layer, since it contains nothing that is not present in the crude alcohol feed to the isopropyl alcohol finishing system, may if desired, be returned through line 12 to the crude isopropyl alcohol stream for alcohol and ether recovery. The upper ether layer 11 is returned directly to the column through line 13 along with small amounts of ether through line 3 to make up losses incurred. The bottoms stream from the column contains secondary butyl alcohol, water and higher impurities which may be withdrawn through line 14 for further processing.

Variations in the method of treating the distillate may be performed. The distillate can be condensed and allowed to separate into two phases; the upper layer only can be water washed and the insoluble portion returned through the ether line 13 to the column. The distillate or the upper layer may be water washed in a countercurrent extraction column wherein more efficient separation of ether and alcohol is possible than under similar conditions of single stage batch washing. It would be possible to operate with either of the two washing methods outlined and with more or less than the usual amount of wash water which is about 50 volumes of water to about 100 volumes of distillate.

In summation then, the secondary butyl alcohol is removed from isopropyl alcohol by adding isopropyl ether to the fractionating tower containing the two alcohols admixed with water. A ternary azeotrope of isopropyl ether-isopropyl alcohol-water forms which boils at 61.6° C. and is taken overhead from the fractionating column for further separation by conventional distillation. The secondary butyl alcohol-water binary azeotrope does not form a ternary azeotrope with isopropyl ether and remains as bottoms in the fractionating column from which it is drawn off for further processing and recovery of secondary butyl alcohol.

A study of the material balance of this operation demonstrates that large quantities of ether recycle are required. The ternary azeotrope is composed of 88.0 weight per cent isopropyl ether, 7.3 weight per cent isopropyl alcohol and 4.7 weight per cent water; hence, the requirement to distill over ten pounds of isopropyl ether for every pound of isopropyl alcohol.

Successful operation can be performed by controlling the distillate composition intermediate between the true ternary azeotrope and the isopropyl alcohol-water binary azeotrope thus, reducing the quantity of recycle ether and suffering some consequent loss in boiling point spread between the distillate and the secondary butyl alcohol water binary azeotrope. However, in actual practice, this could be done by limiting the isopropyl ether on the top plates of the column, by reducing the reflux ratio, or by raising the feed plate, i. e., reducing the fractionating section.

Data have been obtained with a glass bubble-cap fractionating column of eight plates, operating at a reflux ratio of 1:1, which demonstrate the efficiency of this procedure. The following table presents the composition of the distillate obtained from a charge containing isopropyl alcohol and secondary butyl alcohol in the ratio of about 98 to 2 in the presence of an excess of water over that required to satisfy both binary azeotropes of the alcohols and water. The amount of isopropyl ether introduced was varied to produce distillates boiling from 62° C. to 80° C. of varying compositions.

*Azeotropic distillation of aqueous isopropyl alcohol and secondary butyl alcohol*

| Distillate Composition | Distillate Vapor Temperature, °C. | | |
|---|---|---|---|
| | 80° | 72° | 62° |
| Weight Per Cent Isopropyl Alcohol | 88.2 | 43.4 | 15.1 |
| Weight Per Cent Sec.-Butyl Alcohol | 0.4 | 0.1 | nil |
| Weight Per Cent Water | 11.4 | 6.1 | 1.5 |
| Weight Per Cent Isopropyl Ether | 0 | 50.4 | 83.5 |
| Sp. gr. 20/20 | .8185 | .7750 | .7395 |

These data show that there was a steady increase in the amount of isopropyl alcohol relative to the secondary butyl alcohol in the distillate as the concentration of isopropyl ether was increased; and that the desired degree of separation can be balanced against the tolerable amount of recycle ether in the operation to produce the most desirable results.

With regard to the prior art, Lebo, U. S. 1,422,583, has disclosed the separation of secondary butyl alcohol and other higher secondary alcohols from isopropyl alcohol by the use of benzol. The Lebo operation has the disadvantage of requiring that an additional agent (viz., benzol) must be added for which separate recovery facilities, not normally existent in isopropyl alcohol finishing must be provided. Evans, U. S. 2,140,694, relates to a process for removing water from aqueous mixtures of one or more organic oxy-compounds particularly alcohols by using as a third agent an ether, preferably selected from the group consisting of the aliphatic mixed ethers and the aliphatic symmetrical ethers, the latter possessing at least six carbon atoms to the molecule. Evans rules out the aliphatic symmetrical ethers containing less than six carbon atoms because they have such low boiling points and such low carrying capacities for water that their use would not result in the attainment of a condensed distillate containing sufficient water to stratify into two phases. Of course, Evans is concerned chiefly with the removal of water from aqueous solutions of alcohols, ketones, aldehydes, etc., and not with the separation of alcohols from each other such as is the purpose of this invention.

U. S. 2,173,692 to A. Marples, discloses the dehydration of ethyl alcohol by azeotropic distillation with diisopropyl ether as the entraining agent for the water.

While the process described in this invention has disclosed the use of isopropyl ether to form a ternary mixture with isopropyl alcohol and water, other ethers can also be used. For example, ethyl tertiary butyl ether (B. P. 68–69° C.) has been found to be better than isopropyl ether for separating isopropyl and secondary butyl alcohols because the ethyl tertiary butyl ether forms a ternary azeotrope with isopropyl alcohol and water which contains considerably more isopropyl alcohol than does the isopropyl ether-isopropyl alcohol-water ternary azeotrope. Likewise, ethyl tertiary butyl ether does not form a ternary azeotrope with secondary butyl alcohol and water. Ethyl tertiary butyl ether can be manufactured easily and economically according to Evans and Edlund, Industrial and Engineering Chemistry, volume 28, pages 1186–1188 (1936). However, due to the availability of isopropyl ether in the isopropyl alcohol process, the isopropyl ether is used as the preferred agent for the separation. The ethers suitable for our purpose must boil at a temperature high enough to form a ternary azeotrope with isopropyl alcohol and water, but at a temperature low enough not to form a ternary azeotrope with the butyl alcohol and water. To illustrate, ordinary ether or diethyl ether has too low a boiling point (34.6° C.) to form a ternary azeotrope of any substantial water-carrying capacity with isopropyl alcohol and water and is excluded from the class of ethers suitable for our purpose.

Some of the ethers which may be employed in our separation of secondary butyl alcohol from isopropyl alcohol by the method disclosed, in addition to those mentioned, are:

Butyl methyl ether_____ B. P. 70.3° C.
Ethyl isopropyl ether_____ B. P. 54° C.
Ethyl propyl ether_____ B. P. 64° C.
Isobutylmethyl ether_____ B. P. 59° C. at 741 mm.

The low molecular weight, low boiling, unsaturated ethers such as ethyl allyl ether B. P. 67.6° C., have the proper boiling point characteristics to form ternary azeotropes with isopropyl alcohol and water and are not excluded from the class of ethers suitable for our process. However, the unsaturated ethers are not preferred entrainers for our process due to their tendencies to undergo polymerization.

In like manner, the chloroethers of low molecular weight are not excluded from the class of substances for this invention, however, their use is not preferred due to their tendency to undergo hydrolysis in the presence of water.

In general, the low molecular weight aliphatic ethers mixed or symmetrical, saturated or unsaturated and boiling within the range of about 45° C. to about 75° C. are suitable for our invention.

What is claimed is:

1. A process for separating secondary butyl alcohol from an aqueous mixture of secondary butyl alcohol and isopropyl alcohol, which comprises distilling the aqueous mixture in a distillation zone in the presence of a low molecular weight aliphatic ether boiling within the range of about 45° C. to about 75° C., collecting a ternary azeotrope of isopropyl alcohol, aliphatic ether and water as distillate from the distillation zone and recovering secondary butyl alcohol from a bottom portion of the distillation zone.

2. A process for separating secondary butyl alcohol from an aqueous mixture of secondary butyl alcohol and isopropyl alcohol which comprises distilling the mixture in the presence of isopropyl ether, collecting a ternary azeotrope of isopropyl alcohol-isopropyl ether-water as a distillate and recovering secondary butyl alcohol as a residue.

3. A process for separating secondary butyl alcohol from an aqueous mixture of secondary butyl alcohol and isopropyl alcohol which comprises distilling the mixture in the presence of ethyl tertiary butyl ether, collecting a ternary azeotrope of isopropyl alcohol-ethyl tertiary butyl ether-water as a distillate and recovering secondary butyl alcohol as a residue.

4. A process for separating and recovering anhydrous secondary butyl alcohol and anhydrous isopropyl alcohol from an aqueous mixture of secondary butyl alcohol and isopropyl alcohol, which comprises distilling the aqueous mixture in a distillation zone in the presence of a low molecular weight aliphatic ether, boiling within the range of about 45° C. to about 75° C., collecting a ternary azeotrope of isopropyl alcohol, aliphatic ether and water as distillate from the distillation zone, recovering anhydrous secondary butyl alcohol from a bottom portion of said distillation zone and rectifying the ternary azeotrope in a second distillation zone to recover anhydrous isopropyl alcohol therefrom.

ERWIN H. AMICK, JR.
WILLIAM S. HARNEY, JR.

REFERENCES CITED

The following references are of record in the file of this patent:

UNITED STATES PATENTS

| Number | Name | Date |
| --- | --- | --- |
| 1,422,583 | Lebo | July 11, 1922 |
| 2,140,694 | Evans | Dec. 20, 1938 |
| 2,173,692 | Marples | Sept. 19, 1939 |
| 2,392,534 | Vonlxeussler | Jan. 8, 1946 |